(12) United States Patent
Tisch

(10) Patent No.: US 12,052,542 B2
(45) Date of Patent: *Jul. 30, 2024

(54) DYNAMIC WIND NOISE COMPRESSION TUNING

(71) Applicant: GoPro, Inc., San Mateo, CA (US)

(72) Inventor: Erich Tisch, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,286

(22) Filed: May 2, 2023

(65) Prior Publication Data

US 2023/0276167 A1 Aug. 31, 2023

Related U.S. Application Data

(63) Continuation of application No. 17/542,630, filed on Dec. 6, 2021, now Pat. No. 11,678,108, which is a continuation of application No. 16/991,690, filed on Aug. 12, 2020, now Pat. No. 11,197,090.

(60) Provisional application No. 62/900,884, filed on Sep. 16, 2019.

(51) Int. Cl.
*H04R 1/28* (2006.01)
*G06F 16/901* (2019.01)
*H04R 1/22* (2006.01)

(52) U.S. Cl.
CPC ....... *H04R 1/2884* (2013.01); *G06F 16/9017* (2019.01); *H04R 1/222* (2013.01); *H04R 2410/07* (2013.01)

(58) Field of Classification Search
CPC .. H04R 1/2884; H04R 1/222; H04R 2410/07; G06F 16/9017

See application file for complete search history.

(56) References Cited

U.S. PATENT DOCUMENTS

| | | |
|---|---|---|
| 9,906,859 B1 | 2/2018 | Song |
| 11,197,090 B2 | 12/2021 | Tisch |
| 2003/0147538 A1 | 8/2003 | Elko |
| 2006/0233391 A1 | 10/2006 | Park |
| 2008/0226098 A1 | 9/2008 | Haulick |
| 2008/0317261 A1 | 12/2008 | Yoshida |
| 2009/0002498 A1 | 1/2009 | Oku |
| 2012/0288116 A1 | 11/2012 | Saito |
| 2013/0066628 A1 | 3/2013 | Takahashi |
| 2015/0294674 A1 | 10/2015 | Takahashi |
| 2020/0021932 A1 | 1/2020 | Ukai |
| 2021/0084405 A1 | 3/2021 | Tisch |
| 2022/0095042 A1 | 3/2022 | Tisch |

*Primary Examiner* — Jason R Kurr

(74) *Attorney, Agent, or Firm* — Young Basile Hanlon & MacFarlane, P.C.

(57) ABSTRACT

An image capture device with dynamic wind noise compression tuning techniques is described. A technique includes detecting of the presence of wind noise by measuring coherence between at least two microphones. For a compressor, adjusting a default compression threshold and default compression parameters based on the coherence measurements. For each microphone, applying by the compressor the adjusted compression parameters when an audio signal is above the adjusted compression threshold and applying the default compression parameters when the audio signal is below the adjusted compression threshold.

20 Claims, 12 Drawing Sheets

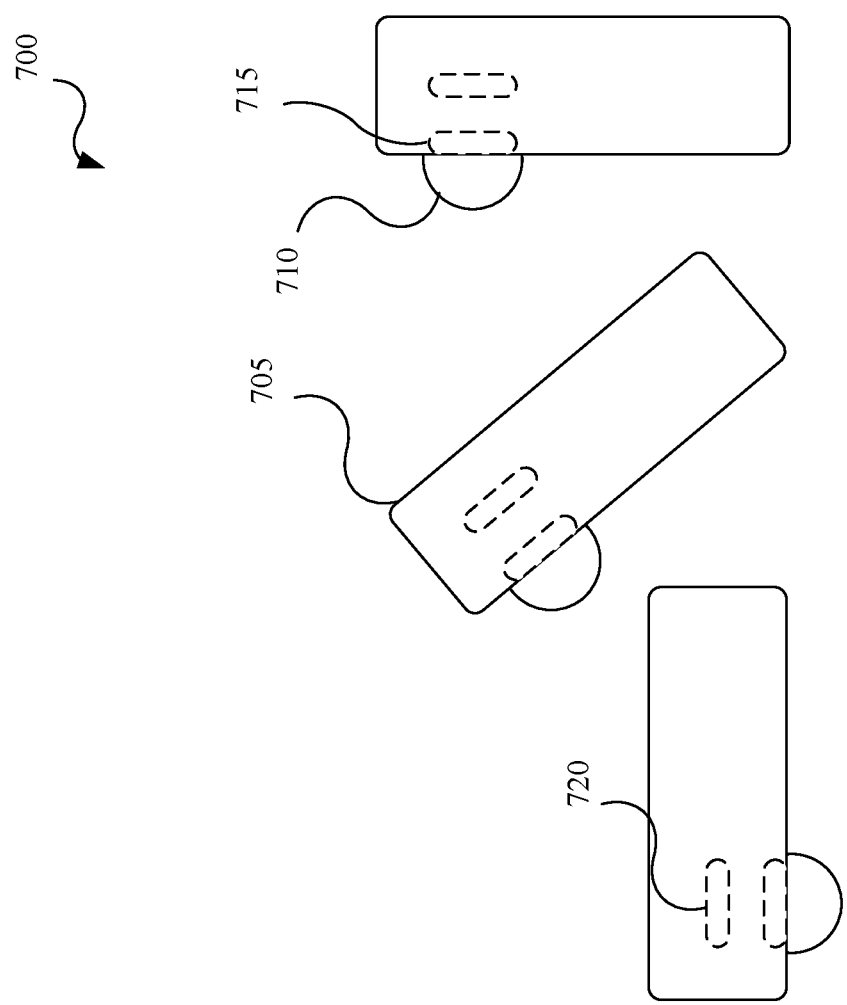
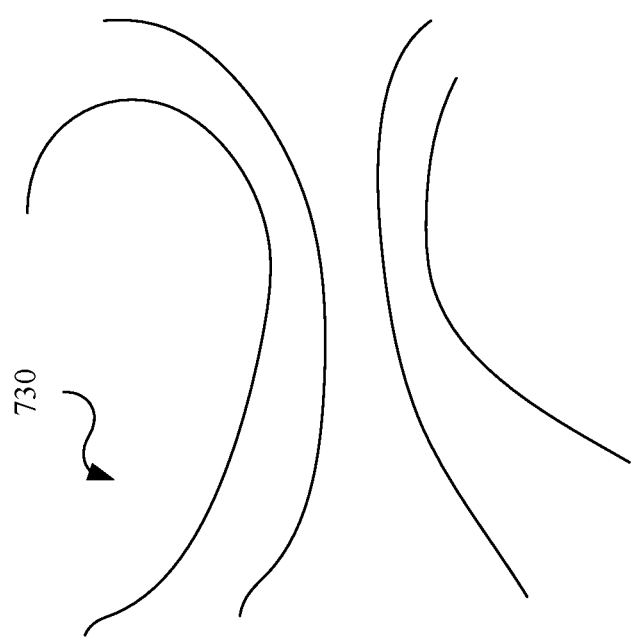
FIG. 7A
FIG. 7B
FIG. 7C

DYNAMIC WIND NOISE COMPRESSION TUNING

CROSS-REFERENCE TO RELATED APPLICATION

This application is a continuation of U.S. patent application Ser. No. 17/542,630, filed Dec. 6, 2021, which is a continuation of U.S. patent application Ser. No. 16/991,690, filed Aug. 12, 2020, now U.S. Pat. No. 11,197,090, which claims priority to and the benefit of U.S. Provisional Patent Application No. 62/900,884, filed Sep. 16, 2019, the entire disclosures of which are hereby incorporated by reference.

TECHNICAL FIELD

This disclosure relates to tuning audio compressors in the presence of wind noise.

BACKGROUND

Image capture devices, such as cameras, may capture content as images or video along with audio. Raw microphone signals are processed by applying gain and using audio compressors, for example, to make the audio listenable. These audio compressors are preset to operate under different scenarios to try to maintain the audio at a nominal level.

SUMMARY

Disclosed herein are implementations of dynamic wind noise compression tuning. In an implementation, an image capture device with dynamic wind noise compression tuning includes at least two microphones, a compressor configured to process audio signals, a detector configured to detect the presence of wind noise by measuring coherence between the at least two microphones, a processor configured to adjust, for the compressor, a compression threshold and compression parameters based on the coherence measurements, and the compressor configured to apply adjusted compression parameters when an audio signal for a microphone from the at least two microphones is above the adjusted compression threshold and apply default compression parameters when the audio signal is below the adjusted compression threshold.

In an implementation, the compression threshold is reduced to initiate compression at an earlier value relative to a default compression threshold setting. In an implementation, a gain parameter of the compressor is increased. In an implementation, the default compression parameters produce the audio signal near or at a nominal level and the adjusted compression threshold and adjusted compression parameters maintain the audio signal near or at the nominal level in windy conditions.

In an implementation, the compression threshold is reduced to increase dynamic range compression as compared to dynamic range compression achieved using a default compression threshold. In an implementation, the coherence measurement is a value in a range of values where one end of the range indicates windy conditions and another end of the range indicates no wind noise conditions.

In an implementation, the device includes a compression threshold look-up table (LUT) indexed by the coherence measurement. In an implementation, the device includes a compression parameters LUT indexed by the coherence measurement.

In an implementation, the device includes an optical component, where one of the at least two microphones is positioned to face a view direction of the optical component.

In an implementation, a technique includes detecting the presence of wind noise by measuring coherence between at least two microphones. For a compressor, a default compression threshold and default compression parameters are adjusted based on the coherence measurements. The compressor applies the adjusted compression parameters when an audio signal for a microphone from the at least two microphones is above the adjusted compression threshold and applies the default compression parameters when the audio signal is below the adjusted compression threshold.

In an implementation, the default compression threshold is reduced to initiate compression at an earlier value relative to the default compression threshold setting. In an implementation, the method includes increasing a gain parameter for the compressor. In an implementation, the default compression parameters produce the audio signal near or at a nominal level in non-wind noise conditions and the adjusted compression threshold and adjusted compression parameters maintain the audio signal near or at the nominal level in windy conditions. In an implementation, the default compression threshold is reduced to increase dynamic range compression as compared to dynamic range compression achieved using the default compression threshold. In an implementation, the coherence measurement is a value in a range of values where one end of the range indicates windy conditions and another end of the range indicates no wind noise conditions. In an implementation, the method includes indexing into a compression threshold look-up table (LUT) by the coherence measurement to adjust the default compression threshold and indexing into a compression parameters LUT by the coherence measurement to adjust the default compression parameters.

In an implementation, a method for dynamic compression tuning includes detecting the presence of an environmental condition by measuring a relational statistic between at least two microphones, adjusting, for a compressor, a default compression threshold based on the relational statistic measurement, adjusting, for the compressor, default compression parameters based on the relational statistic measurement, applying, by the compressor, the adjusted compression parameters when an audio signal for a microphone from the at least two microphones is above the adjusted compression threshold, and applying, by the compressor, the default compression parameters when the audio signal is below the adjusted compression threshold. In an implementation, the default compression threshold is reduced to initiate compression at an earlier value relative to the default compression threshold setting. In an implementation, the method includes increasing a gain parameter for the compressor. In an implementation, the default compression parameters produce the audio signal near or at a nominal level in absence of environmental conditions and the adjusted compression threshold and adjusted compression parameters maintain the audio signal near or at the nominal level in presence of environmental conditions.

In an implementation, an image capture device with dynamic wind noise compression tuning includes at least two microphones, a detector configured to detect the presence of wind noise by obtaining a measure of coherence between the at least two microphones, a compressor configured to process audio signals from the at least two microphones, and a configuration unit configured to adjust, for the compressor, a compression threshold based on the obtained measure of coherence by the detector. The compressor is configured to apply adjusted compression parameters to the audio signals when an audio signal for a microphone from the at least two microphones is above the adjusted compression threshold and apply default compression parameters to the audio signals when the audio signal for the microphone is below the adjusted compression threshold. In an implementation, the configuration unit is further configured to increase, for the compressor, gain parameters based on the obtained measure of coherence. In an implementation, increasing the gain parameters results in amplification of at least a portion of the audio signal for the microphone. In an implementation, the configuration unit reduces the compression threshold to initiate compression at an earlier value relative to a default compression threshold. In an implementation, the default compression parameters produce the audio signal for the microphone near or at a nominal level and the adjusted compression threshold and adjusted compression parameters maintain the audio signal for the microphone near or at the nominal level in windy conditions. In an implementation, the configuration unit reduces the compression threshold to increase dynamic range compression as compared to dynamic range compression achieved using a default compression threshold. In an implementation, a measure of coherence is a value in a range of values where one end of the range indicates windy conditions and another end of the range indicates no wind noise conditions. In an implementation, the configuration unit is configured to use a compression threshold look-up table (LUT) indexed by the obtained measure of coherence to adjust the compression threshold and to use a compression parameters LUT indexed by the obtained measure of coherence to adjust compression parameters. In an implementation, the device further includes an optical component, wherein one of the at least two microphones is positioned to face a view direction of the optical component.

In an implementation, a method for dynamic wind noise compression tuning includes obtaining a coherence measure for a pair of microphones, obtaining a reduced compression threshold relative to a default compression threshold based on the obtained coherence measure, obtaining an increased gain parameter relative to a default gain parameter based on the obtained coherence measure, using the increased gain parameter when an audio signal for a microphone from the pair of microphones is above the reduced compression threshold, and using the default gain parameter when the audio signal for the microphone from the pair of microphones is below the reduced compression threshold. In an implementation, the reduced compression threshold initiates compression at an earlier value relative to the default compression threshold. In an implementation, the increased gain parameter results in amplification of at least a portion of the audio signal. In an implementation, the default compression threshold and the default gain parameter produce the audio signal near or at a nominal level in non-wind noise conditions and the reduced compression threshold and the increased gain parameter maintain the audio signal near or at the nominal level in windy conditions. In an implementation, use of the reduced compression threshold increases dynamic range compression as compared to dynamic range compression achieved using the default compression threshold. In an implementation, the coherence measurement is a value in a range of values where one end of the range indicates windy conditions and another end of the range indicates no wind noise conditions. In an implementation, the method further includes indexing into a compression threshold look-up table (LUT) by the obtained coherence measure to adjust the compression threshold.

In an implementation, a method for dynamic compression tuning includes obtaining a coherence measure for a pair of microphones, obtaining a reduced compression threshold relative to a default compression threshold based on the obtained coherence measure, initiating dynamic range compression earlier relative to a default dynamic range compression when an audio signal for a microphone from the pair of microphones is above the reduced compression threshold, and using the default dynamic range compression when the audio signal for the microphone from the pair of microphones is below the reduced compression threshold. In an implementation, the method includes obtaining an increased gain parameter relative to a default gain parameter based on the obtained coherence measure and using the increased gain parameter when an audio signal for a microphone from the pair of microphones is above the reduced compression threshold. In an implementation, the increased gain parameter results in amplification of at least a portion of the audio signal. In an implementation, the dynamic range compression is associated with producing the audio signal near or at a nominal level in non-wind noise conditions and the increased gain parameter maintains the audio signal near or at the nominal level in windy conditions.

In an implementation, an image capture device with dynamic wind noise compression tuning includes a configuration unit configured to adjust a compression threshold based on a measure of coherence, the measure of coherence indicative of wind noise; and a compressor. The compressor configured to apply adjusted compression parameters to audio signals from at least two microphones of the image capture device when an audio signal for a microphone from the at least two microphones breaches the adjusted compression threshold in one direction; and apply default compression parameters to the audio signals from the at least two microphones when the audio signal for the microphone from the at least two microphones breaches the adjusted compression threshold in another direction. In an implementation, the configuration unit is further configured to increase, for the compressor, gain parameters based on the measure of coherence. In an implementation, increasing the gain parameters results in amplification of at least a portion of the audio signal for the microphone. In an implementation, the configuration unit reduces the compression threshold to initiate compression at an earlier value relative to a default compression threshold. In an implementation, the default compression parameters produce the audio signal for the microphone near or at a nominal level and the adjusted compression threshold and adjusted compression parameters maintain the audio signal for the microphone near or at the nominal level in windy conditions. In an implementation, the configuration unit reduces the compression threshold to increase dynamic range compression as compared to dynamic range compression achieved using a default compression threshold. In an implementation, the measure of coherence is a value in a range of values where one end of the range indicates windy conditions and another end of the range indicates no wind noise conditions. In an implementation, the device further includes the configuration unit configured to use a compression threshold look-up table (LUT) indexed by the measure of coherence to adjust the compression threshold; and the configuration unit configured to use a compression parameters LUT indexed by the measure of coherence to adjust compression parameters. In an implementation, the device further includes an optical component, wherein one of the at least two microphones is positioned to face a view direction of the optical component.

In an implementation, a method for dynamic wind noise compression tuning, the method includes obtaining a reduced compression threshold relative to a default compression threshold based on a coherence measure for a pair of microphones of an image capture device, using an increased gain parameter in lieu of a default gain parameter when an audio signal for a microphone from the pair of microphones breaches the reduced compression threshold in one direction, the increased gain parameter based on the coherence measure, and using the default gain parameter when the audio signal for the microphone from the pair of microphones breaches the reduced compression threshold in another direction. In an implementation, the reduced compression threshold initiates compression at an earlier value relative to the default compression threshold. In an implementation, the increased gain parameter results in amplification of at least a portion of the audio signal. In an implementation, the default compression threshold and the default gain parameter produce the audio signal near or at a nominal level in non-wind noise conditions and the reduced compression threshold and the increased gain parameter maintain the audio signal near or at the nominal level in windy conditions. In an implementation, use of the reduced compression threshold increases dynamic range compression as compared to dynamic range compression achieved using the default compression threshold. In an implementation, the coherence measurement is a value in a range of values where one end of the range indicates windy conditions and another end of the range indicates no wind noise conditions. In an implementation, the method further includes indexing into a compression threshold look-up table (LUT) by the coherence measure to adjust the compression threshold.

In an implementation, a method for dynamic compression tuning includes when an audio signal for a microphone from a pair of microphones of an image capture device breaches a reduced compression threshold in one direction, initiating early dynamic range compression which is earlier relative to a default dynamic range compression, wherein the reduced compression threshold is reduced relative to a default compression threshold and based on a coherence measure for the pair of microphones; and when the audio signal for the microphone from the pair of microphones breaches the reduced compression threshold in another direction, initiating the default dynamic range compression. In an implementation, the method includes obtaining an increased gain parameter relative to a default gain parameter based on the coherence measure; and when an audio signal for a microphone from the pair of microphones breaches the reduced compression threshold, using the increased gain parameter. In an implementation, the increased gain parameter results in amplification of at least a portion of the audio signal. In an implementation, the dynamic range compression is associated with producing the audio signal near or at a nominal level in non-wind noise conditions and the increased gain parameter maintains the audio signal near or at the nominal level in windy conditions.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 7A-7C are block diagrams of an example of an image capture device changing orientations in the presence of wind noise.

DETAILED DESCRIPTION

Figure 1A:
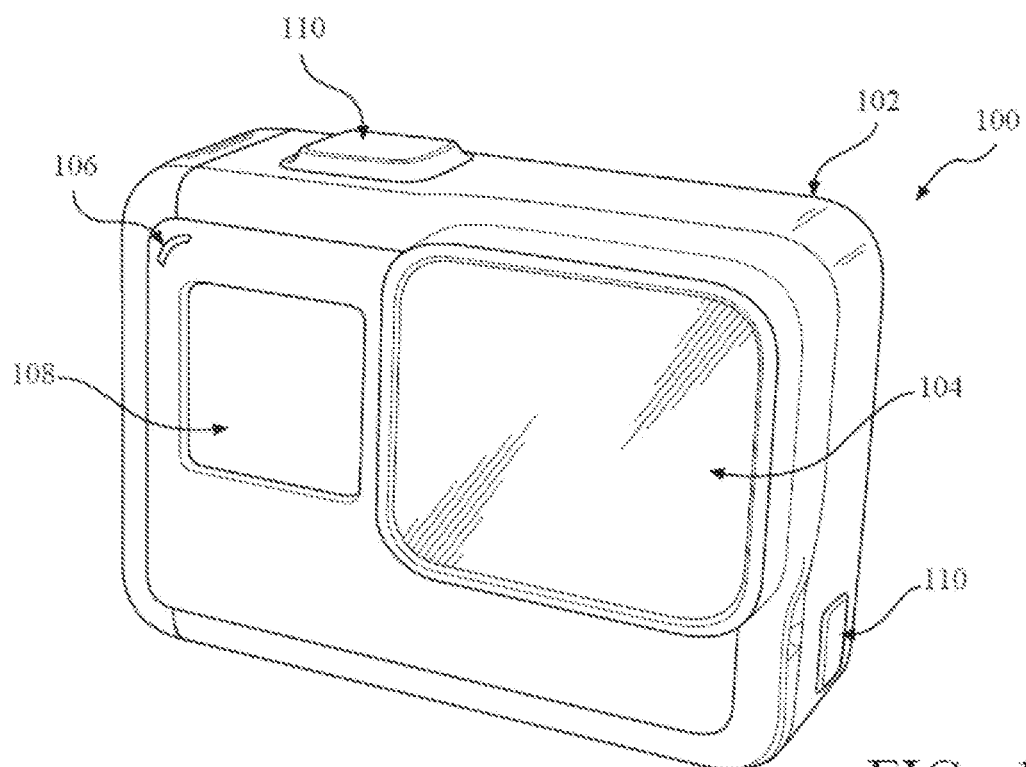
FIGS. 1A-D are isometric views of an example of an image capture device.

Image capture devices, such as cameras, may capture content which includes images, video, and audio. Raw microphone signals are processed by applying gain and using audio compressors, for example, to make the audio listenable. Raw microphone signals are processed by applying gain because raw microphone signals are low in amplitude or power. Microphones however may have a wide dynamic range, for example, over a 100 dB range. Audio compressors therefore use compression parameters to bring down the level of the loudest signals so that the loud and quiet signal parts are closer together in volume and volume variations are less distinct and apply a gain to the compressed signal, effectively boosting the quieter parts to be closer to the louder parts. The degree of compression and gain applied and when the compression and gain is to be applied by the audio compressor is controlled via a compression threshold. For example, if the audio input to the audio controller is below the compression threshold, the audio compressor is not applied. The compression threshold and compression parameters of the audio compressors are preset to operate under different scenarios to try to maintain the audio at a nominal level.

Image capture devices are however subject to various environmental conditions and scenarios including, for example, wind noise conditions which affect the microphone signals and consequently the listenability of the audio. Implementations of this disclosure address problems such as these using dynamic wind noise compression tuning systems and techniques. In an implementation, a wind detector or meter determines a level or presence of wind noise which may be impacting the microphones of an image capture device. The wind detector determines a measurement of coherence between the microphones of the image capture device. The coherence measurement value is used to adjust the compression threshold and the compression parameters with respect to the level of wind noise. In an implementation, the coherence measurement value is used to reduce the compression threshold and increase the gain to maintain the nominal level of the audio and reduce the wind noise signal level. The effective result is that the nominal level is kept constant but the dynamic range is reduced so that wind noise (which inherently is buffeting and varying in levels) is subjectively smoother. Wind noise, for example, may be sound that varies as wind passes over or through objects, such as an inlet of the microphone, camera body, and the like.

The implementations of this disclosure are described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
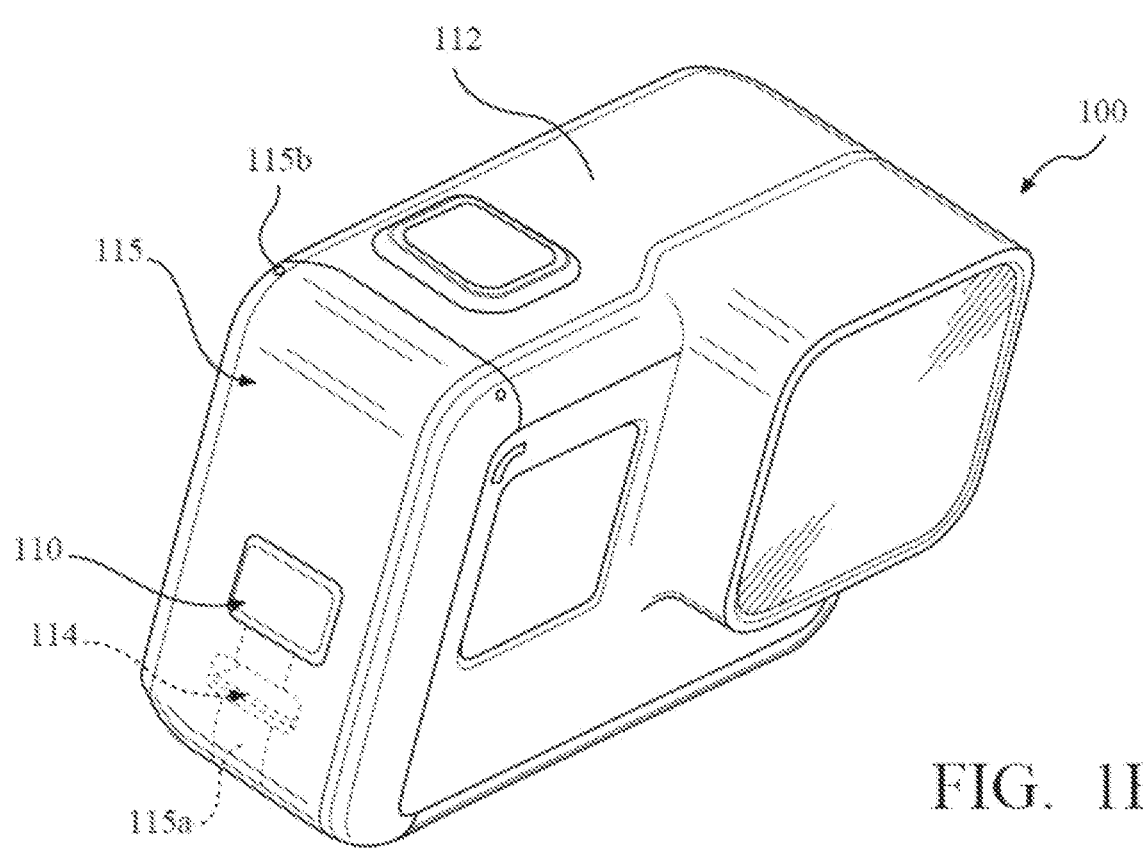
Figure 1C:
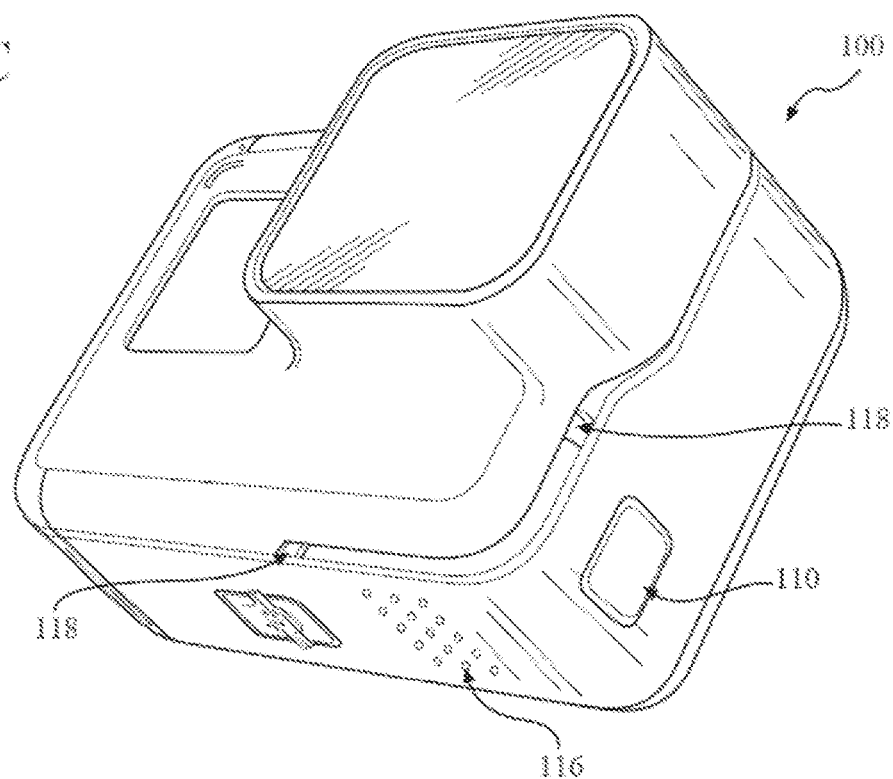
Figure 1D:
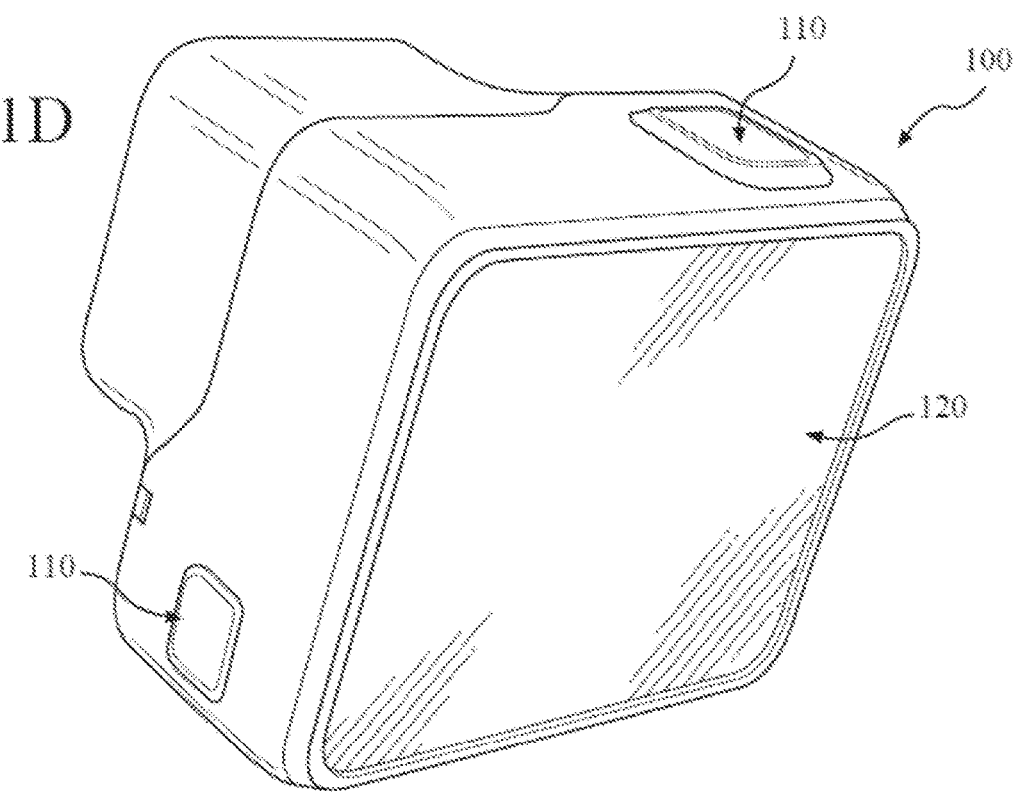

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115a (e.g., hidden as indicated using dotted lines) that is opened by engaging the associated button 110 as shown.

The removable door 115 can also be secured to the image capture device 100 using a hinge mechanism 115b, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115a and the hinge mechanism 115b allow the removable door 115 to be removed from the image capture device 100.

The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes and hot shoes that can add functional features to the image capture device 100, etc.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100 such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
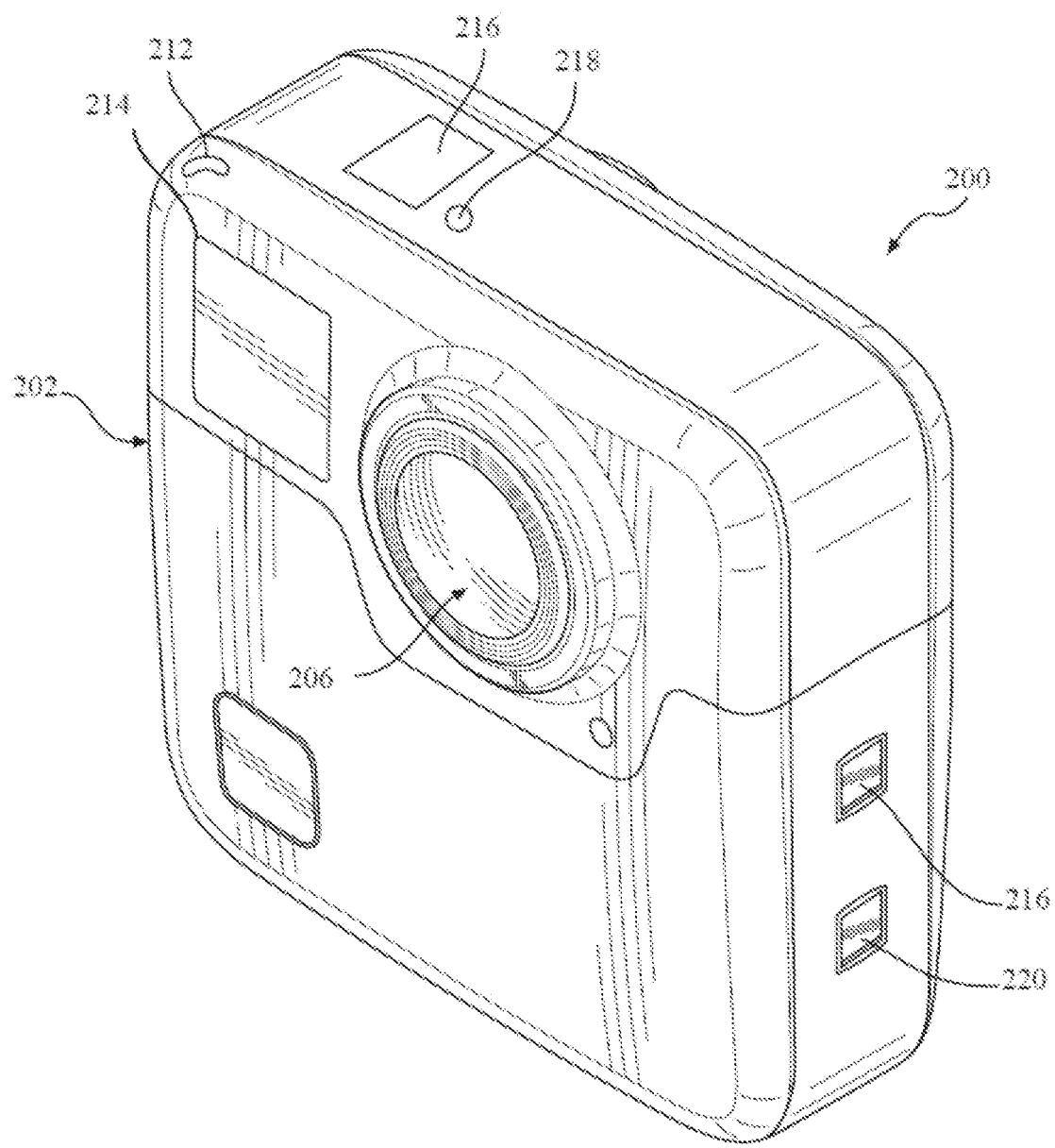
FIGS. 2A-B are isometric views of another example of an image capture device.
Figure 2B:
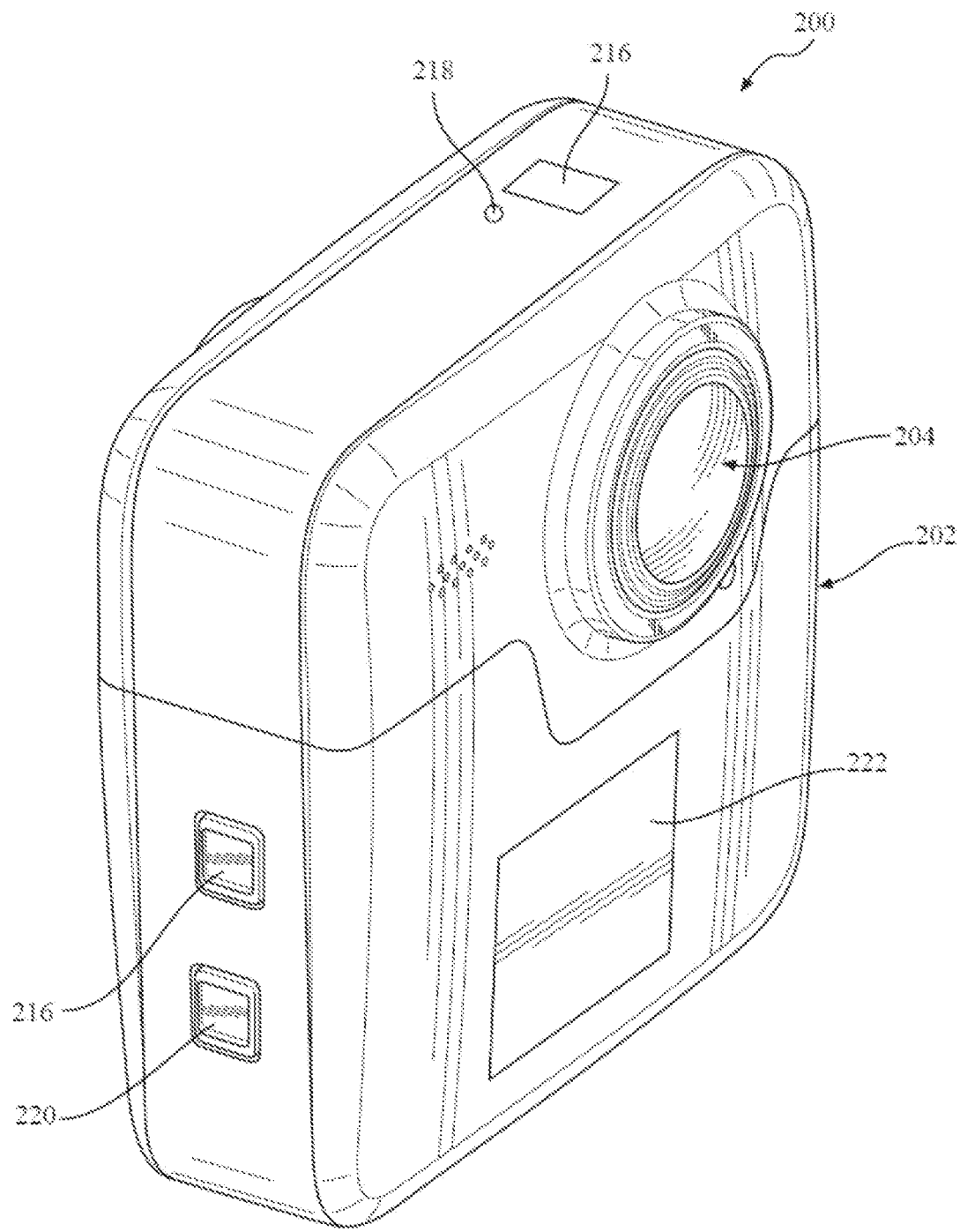

FIGS. 2A-B illustrate another example of an image capture device 200. The image capture device 200 includes a body 202 and two camera lenses 204, 206 disposed on opposing surfaces of the body 202, for example, in a back-to-back or Janus configuration.

The image capture device may include electronics (e.g., imaging electronics, power electronics, etc.) internal to the body 202 for capturing images via the lenses 204, 206 and/or performing other functions. The image capture device may include various indicators such as an LED light 212 and an LCD display 214.

The image capture device 200 may include various input mechanisms such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
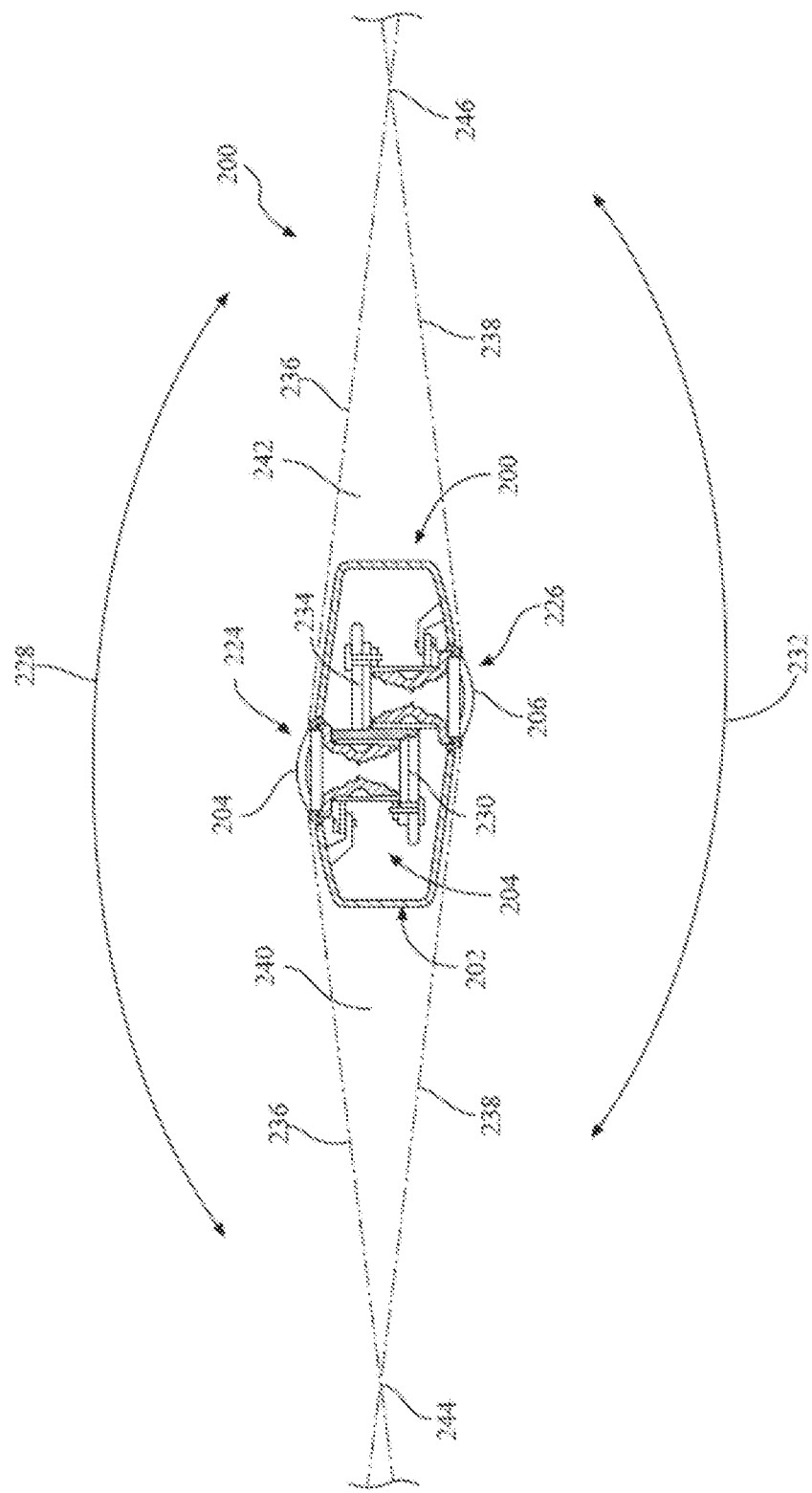
FIG. 2C is a cross-sectional view of the image capture device of FIGS. 2A-B.

FIG. 2C is a cross-sectional view of the image capture device 200 of FIGS. 2A-B. The image capture device 200 is configured to capture spherical images, and accordingly, includes a first image capture device 224 and a second image capture device 226. The first image capture device 224 defines a first field-of-view 228 as shown in FIG. 2C and includes the lens 204 that receives and directs light onto a first image sensor 230.

Similarly, the second image capture device 226 defines a second field-of-view 232 as shown in FIG. 2C and includes the lens 206 that receives and directs light onto a second image sensor 234. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242 may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figures 3A, 3B:
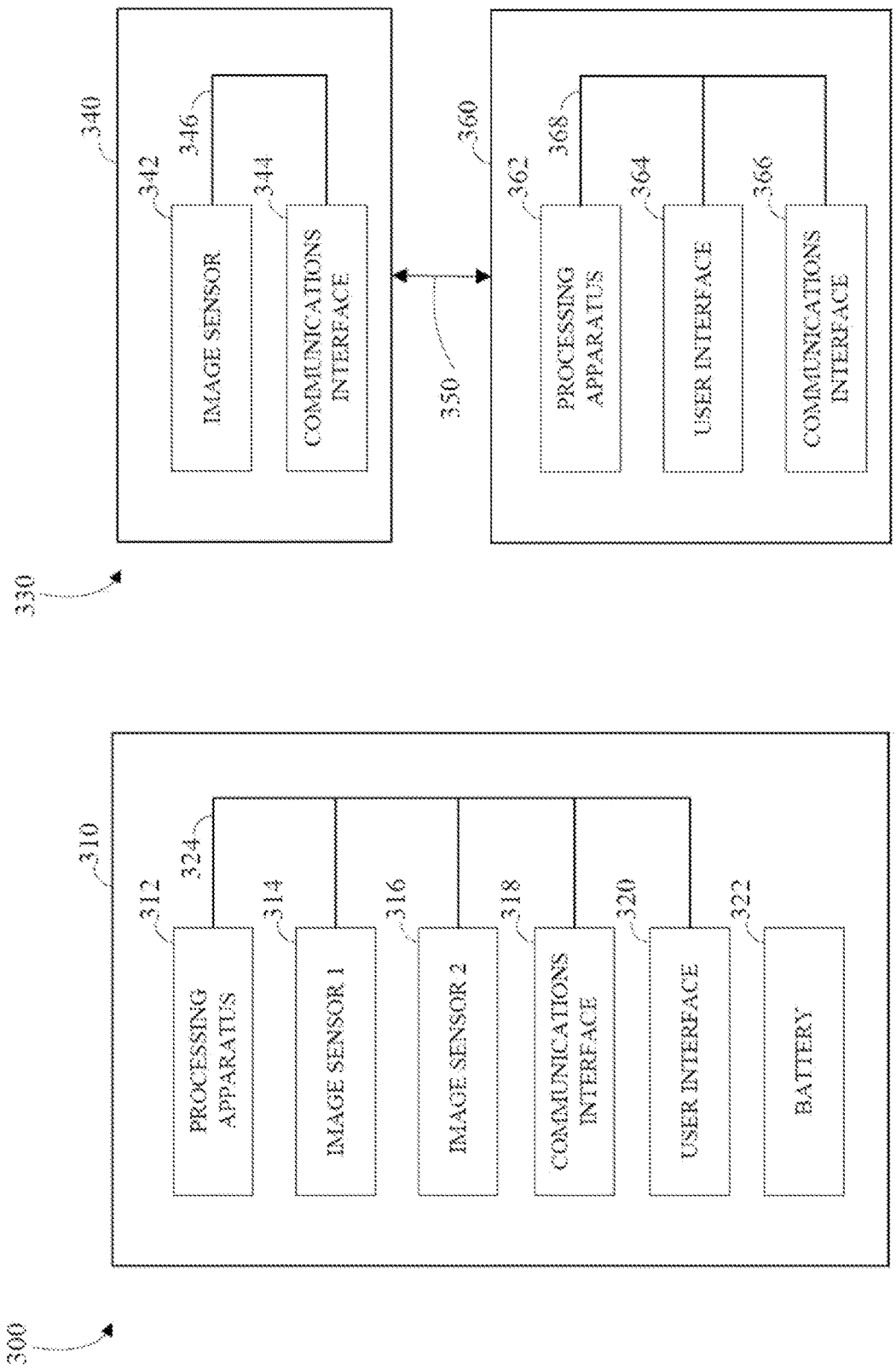
FIGS. 3A-B are block diagrams of examples of image capture systems.

FIGS. 3A-B are block diagrams of examples of image capture systems.

Referring first to FIG. 3A, an image capture system 300 is shown. The image capture system 300 includes an image capture device 310 (e.g., a camera or a drone), which may, for example, be the image capture device 200 shown in FIGS. 2A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312.

For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

Figure 8:
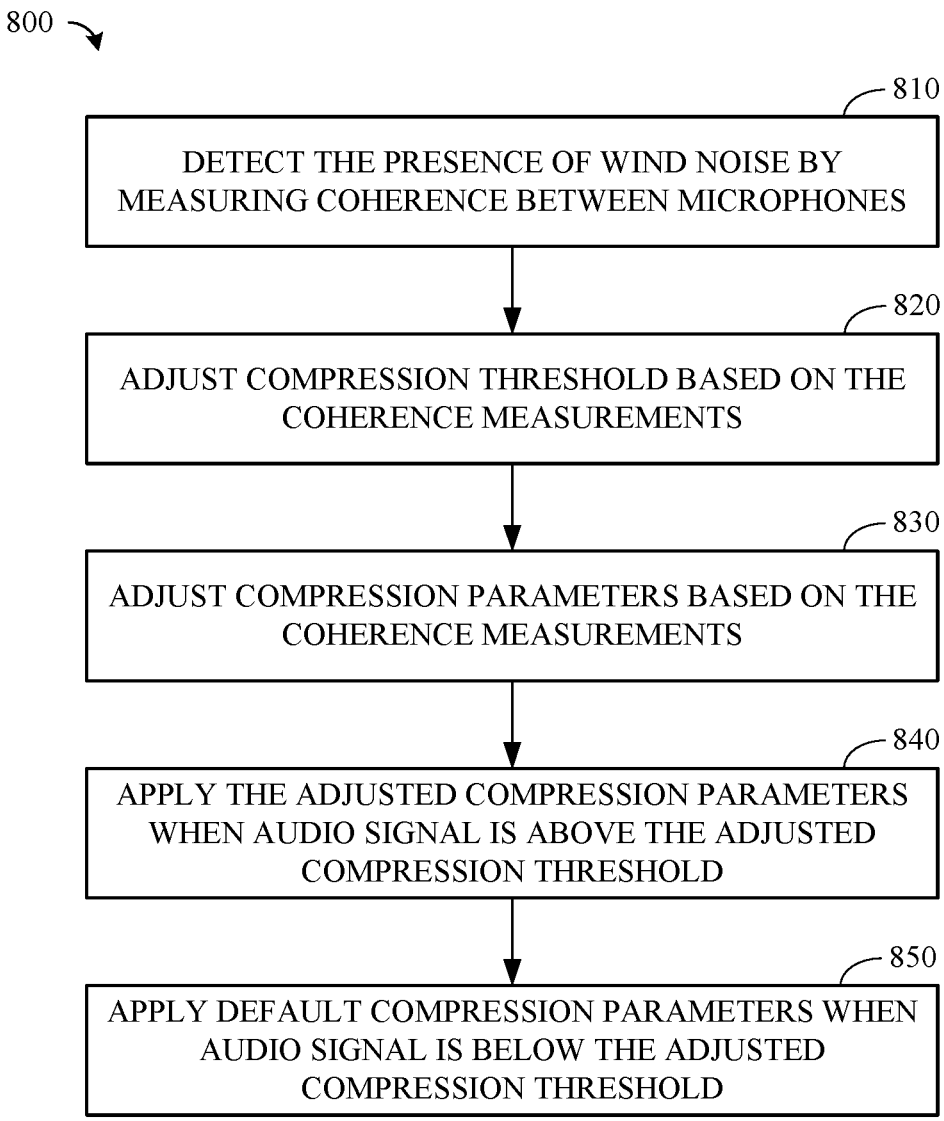
FIG. 8 is a flowchart showing an example of a technique for dynamic wind noise compression tuning.
Figure 9:
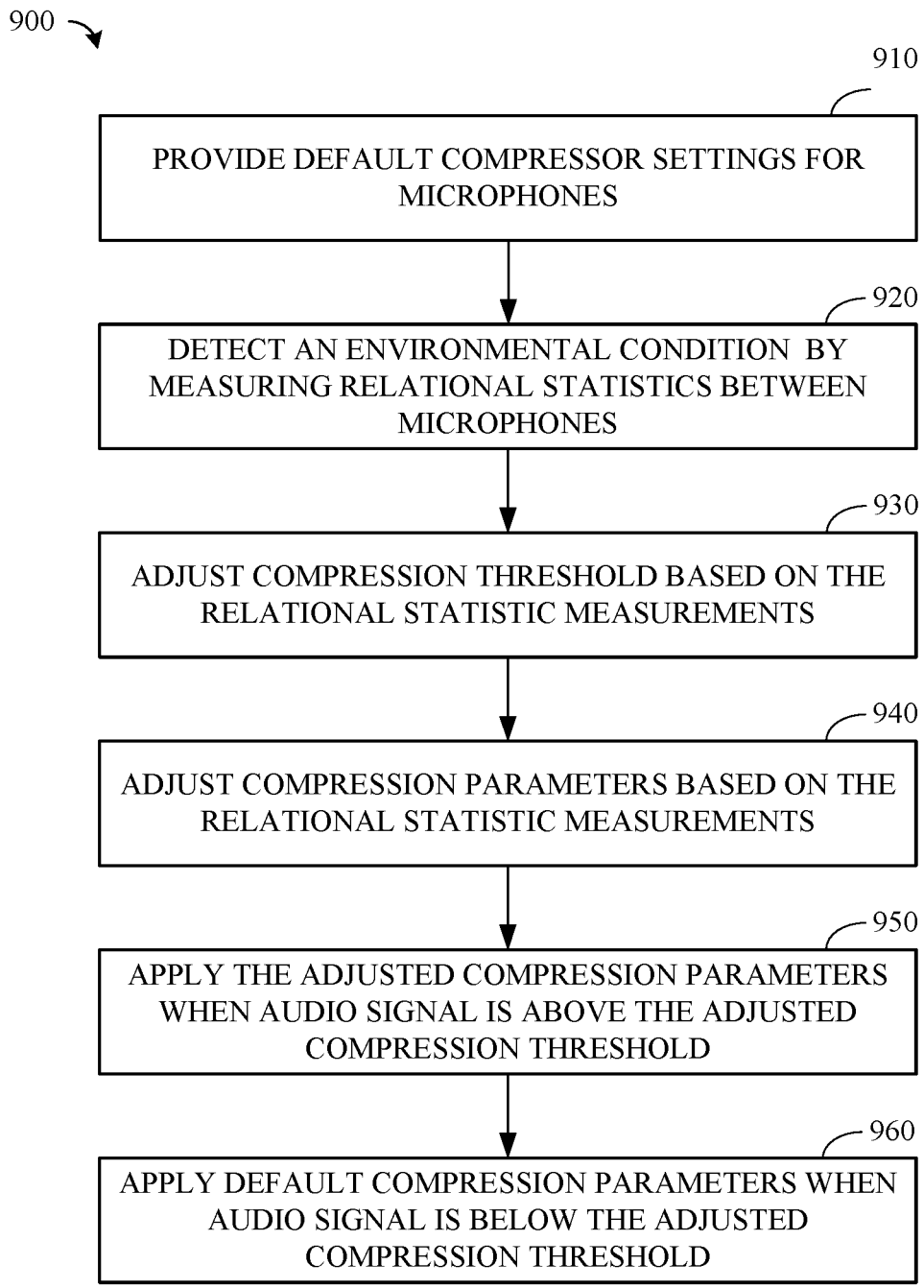
FIG. 9 is a flowchart showing an example of a technique for setting audio compressors in different environments.

The image capture system 300 may be used to implement some or all of the techniques described in this disclosure, such as the technique for dynamic wind noise compression tuning as described in FIG. 8 and the technique for technique for setting audio compressors in different environments as described in FIG. 9.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off. In some implementations, commands (e.g., start recording video, stop recording video, or capture photo) received via the user interface 364 may be passed on to the image capture device 340 via the communications link 350.

The image capture system 330 may be used to implement some or all of the techniques described in this disclosure, such as the technique for dynamic wind noise compression tuning as described in FIG. 8 and the technique for technique for setting audio compressors in different environments as described in FIG. 9.

Figure 4B:
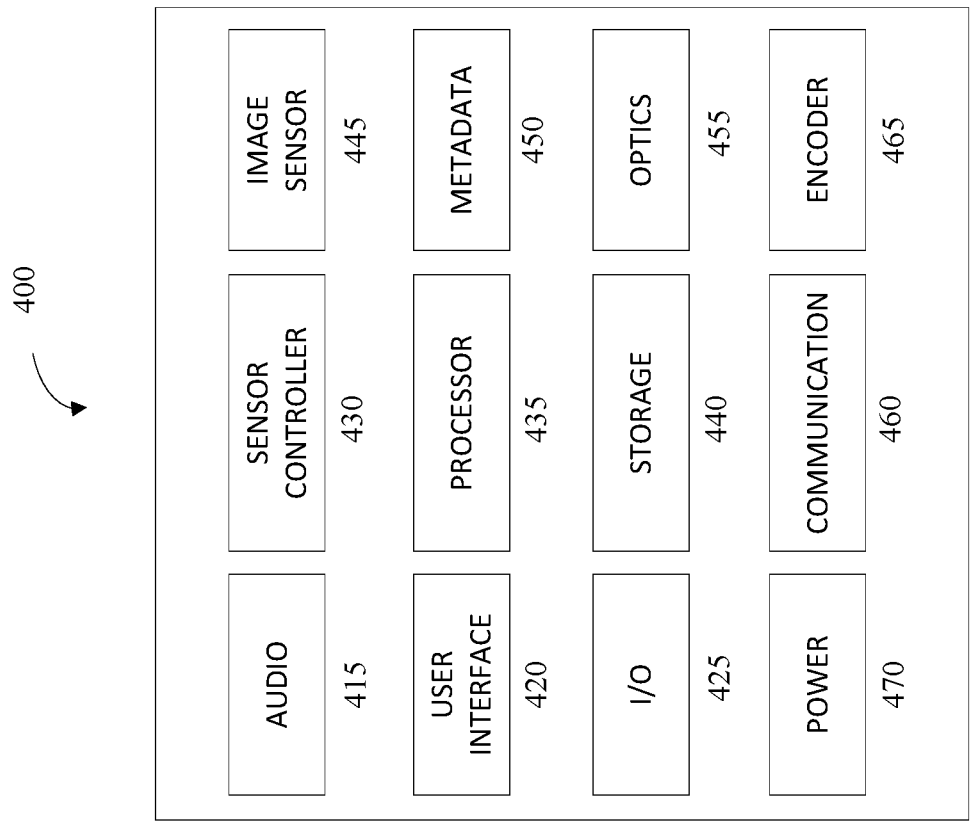
FIGS. 4A-B are a perspective view and a schematic representation of an image capture device.
Figure 4A:
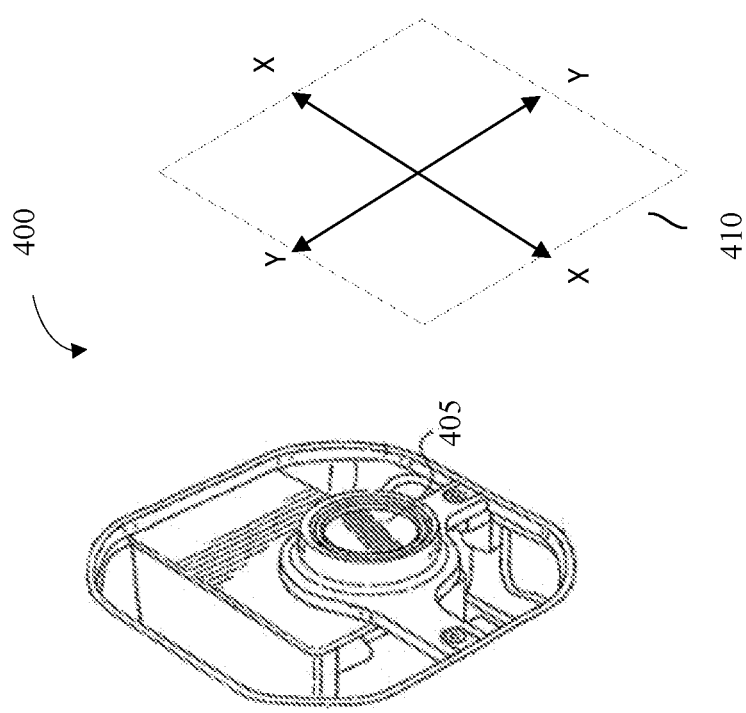

FIG. 4A is a perspective view of another example of an image capture device 400 together with an associated field-of-view and FIG. 4B is a schematic representation of the image capture device 400. The image capture device 400 includes one or more optical components or elements 405 with an associated field-of-view 410 that extends, for example, 90° in a lateral dimension X-X and 120° in a longitudinal dimension Y-Y. Dependent upon the capabilities of the particular optical component(s) 405, however, the extent of the field-of-view 410 may be varied (i.e., increased or decreased) in the lateral dimension or the longitudinal dimension. Suitable optical component(s) 405 may include one or more lenses, macro lenses, zoom lenses, special-purpose lenses, telephoto lenses, prime lenses, achromatic lenses, apochromatic lenses, process lenses, wide-angle lenses, ultra-wide-angle lenses, fisheye lenses, infrared lenses, ultraviolet lenses, spherical lenses, and perspective control lenses. In some image capture devices, multiple, overlapping fields of view are employed to increase the capability of the device, for example, by including two or more optical elements. For example, a first fisheye image may be a round or elliptical image, and may be transformed into a first rectangular image; a second fisheye image may be a round or elliptical image, and may be transformed into a second rectangular image; and the first and second rectangular images may be arranged side-by-side, which may include overlapping, and stitched together to form the equirectangular planar image.

As seen in FIG. 4A in addition to the optical component(s) 405, the image capture device 400 may further include an audio component 415, a user interface (UI) unit 420, an input/output (I/O) unit 425, a sensor controller 430, a processor 435, an electronic storage unit 440, an image sensor 445, a metadata unit 450, an optics unit 455, a communication unit 460, an encoder 465, and power system 470. Suitable examples of the image sensor 445 may include a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

During the processing of images, it is envisioned that the processor 435 may detect or measure a level of wind noise. The processor 435 may implement some or all of the techniques described in this disclosure such as the technique for dynamic wind noise compression tuning as described in FIG. 8 and the technique for technique for setting audio compressors in different environments as described in FIG. 9.

Figure 5:
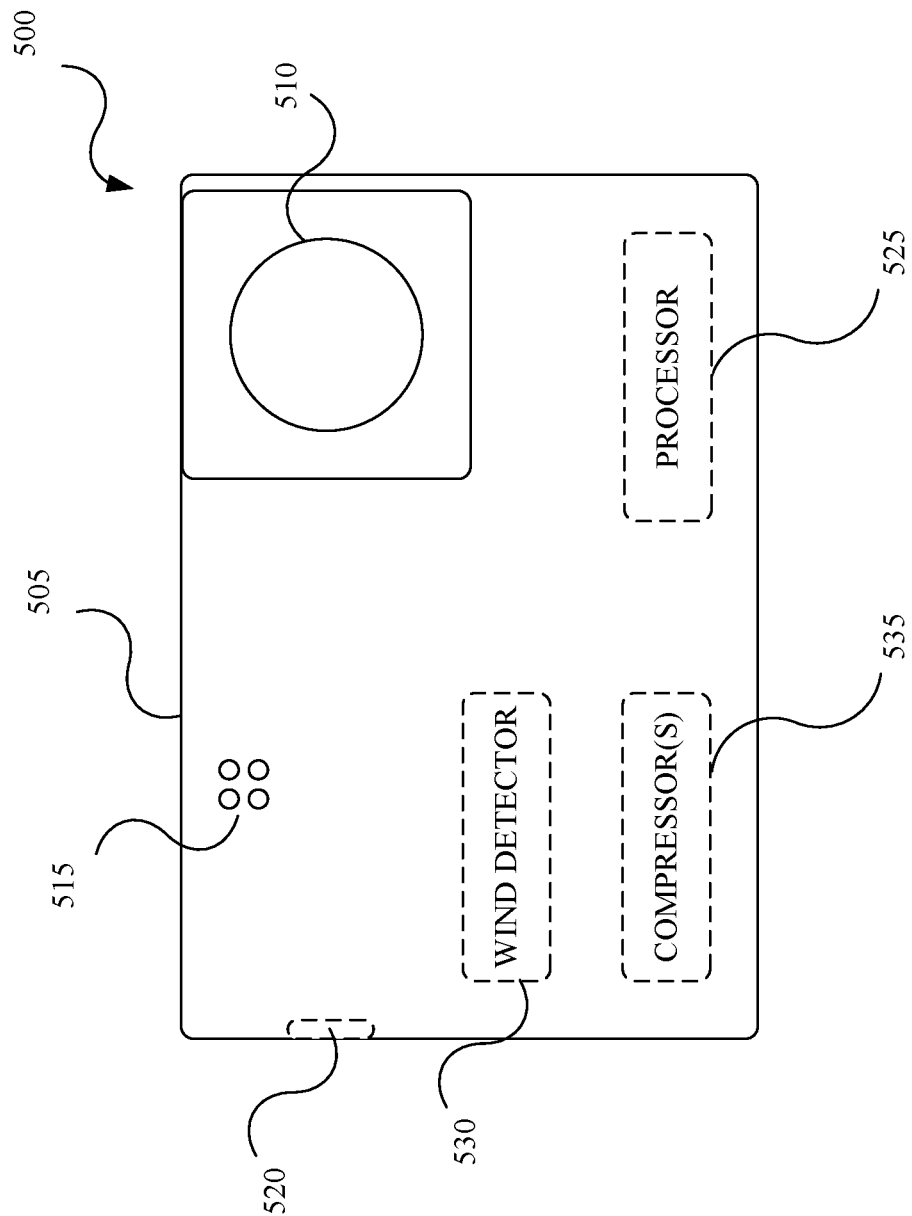
FIG. 5 is a block diagram of an example of an image capture device.

FIG. 5 is a diagram of an image capture device 500 including a body 505, one or more optical components 510 structured on the body 505, one or more microphones 515 and 520 internal to and structured on the body 505, and a processor 525 internal to the body 505. The image capture device 500 may include a detector 530 internal to the body 505, and one or more compressors 535 internal to the body 505. The image capture device 500 may include any or all features and/or characteristics described with respect to FIGS. 1-4B. Although shown as a single element, in alternate embodiments, the number of each element may be varied without departing from the scope of the present disclosure.

The one or more optical components 510 may include any or all features and/or characteristics described with respect to FIGS. 1-4. For example, the one or more optical components 510 may include one or more lenses, macro lenses, zoom lenses, special-purpose lenses, telephoto lenses, prime lenses, achromatic lenses, apochromatic lenses, process lenses, wide-angle lenses, ultra-wide-angle lenses, fisheye lenses, infrared lenses, ultraviolet lenses, perspective control lenses, and/or any other lens(es) and/or combinations thereof.

The one or more microphones 515 and 520 may include any or all features and/or characteristics described with respect to FIGS. 1-4B. For example, the one or more microphones 515 and 520 may be microphones which may receive, sample, capture, and/or record audio data, such as sound waves which may be related to image or video data, and/or may be audio cues or commands for initiating content capture as described herein. For example, the audio data, cues, or commands may be associated with a virtual assistant system, voice-activated system or voice-enabled system. In an implementation, the microphone 515 may be a front facing or optical components 510 facing microphone. That is, the microphone 515 is facing in the same direction as the optical components 510. In an implementation, the microphone 520 may be positioned on a side surface (as shown), or any other surface as shown in FIGS. 1A-1D and 2A-2C.

The processor 525 may include any or all features and/or characteristics described with respect to FIGS. 1-4B and may be a system-on-chip, image signal processor, a controller or combinations thereof. The processor 525 may collectively work with the optical components 510, the one or more microphones 515 and 520, the wind detector 530, the compressor 535, and/or combinations thereof, as appropriate, to perform dynamic wind noise compression tuning.

The wind detector 530 may process and analyze the electrical signals generated by the wind as it hits the one or more microphones 515 and 520, e.g. wind noise. The position of each of the one or more microphones 515 and 520 and the body 505 causes the wind to hit each of the one or more microphones 515 and 520 differently. The wind detector 530 measures the coherence between microphones 515 and 520 as an indication of the levels of local turbulence at the one or more microphones 515 and 520. In an implementation, the coherence measurement may vary between 0 and 1, where 1 is no wind noise and 0 is windy. In an implementation, the wind detector 530 may be implemented in hardware, software, firmware, combinations thereof or the like. In an implementation, the wind detector 530 may be implemented as a standalone processor, an ASIC, a field-programmable gate array (FPGA), combinations thereof or the like. In an implementation, the wind detector 530 may be implemented using the processor 525. The wind detector 530 information may be provided to other elements in the image capture device 500 including, but not limited to, the processor 525 and the compressor 530.

The one or more compressors 535 may be preset with a compression threshold and a set of compressor parameters (collectively default compressor settings), where the compression threshold and the set of compressor parameters are known control parameters as used in audio compressors. In an implementation, the one or more compressors 535 is a compressor which operates on the one or more microphones 515 and 520. In an implementation, the compressor is a multiband compressor operating independently for different frequency ranges. In an implementation, the compressor is separated into 2 bands, one frequency band below 250 Hz and one frequency band above 250 Hz. For purposes of reference and illustration, the compression threshold is nominally a negative number. The compression parameters include, for example, a gain parameter. The default compressor settings may be adjusted to maintain the audio signal at a nominal level when wind impacts the one or more microphones 515 and 520. Both the compression threshold and the compression parameters are adjusted based on the coherence measurement provided by the wind detector 530. In an implementation, the compression threshold is reduced so that compression of the dynamic range may be started earlier. That is, the dynamic range is compressed greater relative to the default compressor settings so that the difference between loud and soft is even less. The lower the coherence measurement, the greater the reduction in the compression threshold. The compression parameters, such as for example, the gain are increased for lower coherence measurements. In an implementation, the one or more compressors 535 may be implemented as a standalone processor, an ASIC, a field-programmable gate array (FPGA), combinations thereof or the like. In an implementation, the one or more compressors 535 may be implemented using the processor 525. The one or more compressors 535 information may be provided to other elements in the image capture device 500 including, but not limited to, the processor 525.

Figure 6:
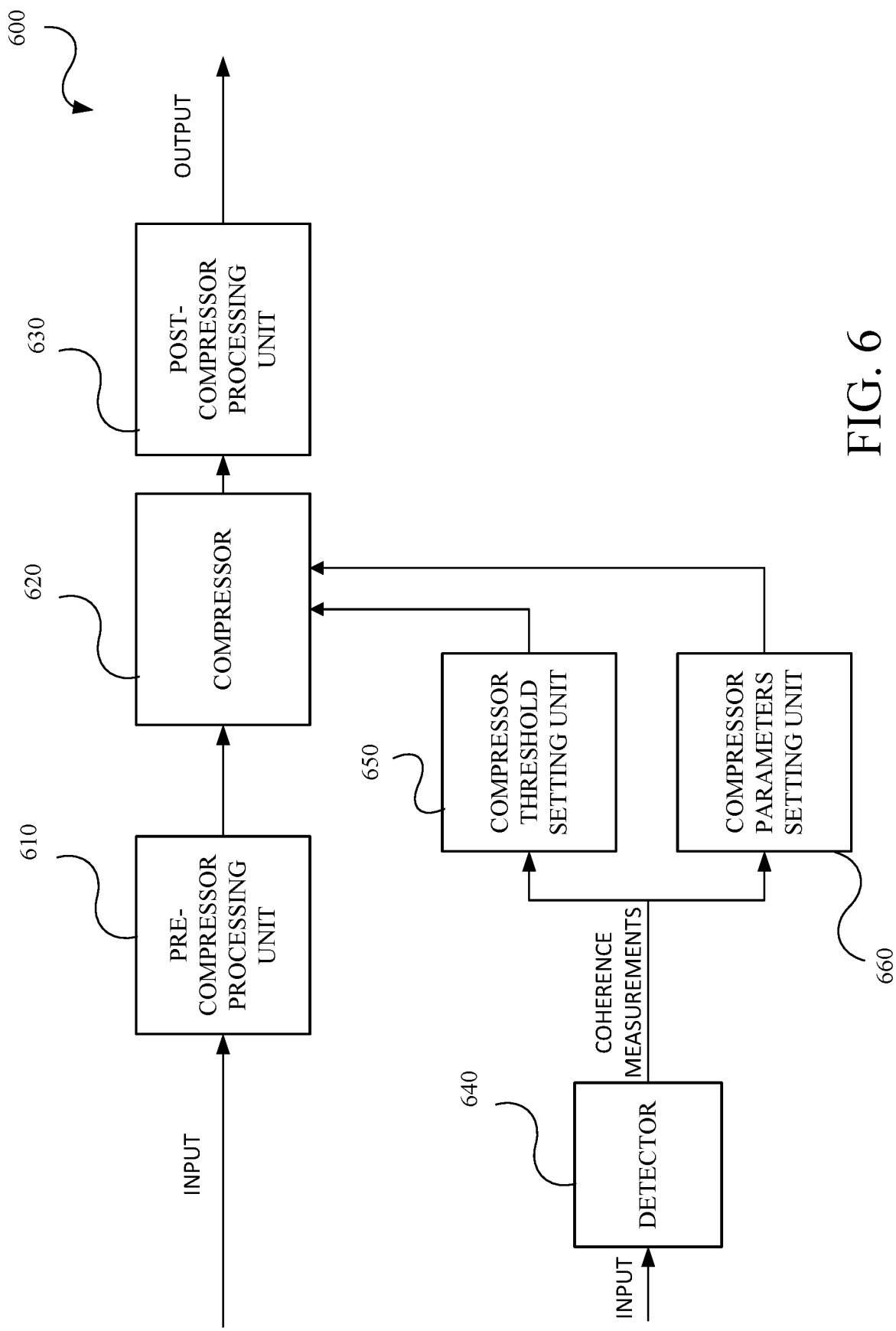
FIG. 6 is a block diagram of an example of a dynamic wind noise compression tuning pipeline.

FIG. 6 is a block diagram of an example of a dynamic wind noise compression tuning pipeline 600. In some implementations, the dynamic wind noise compression tuning pipeline 600 may be included in an image capture device, such as the image capture device 100 shown in FIGS. 1A-D, the image capture device 200 shown in FIGS. 2A-C, the image capture device 310 shown in FIG. 3A, the image capture device 340 shown in FIG. 3B, or the image capture device 500 of FIG. 5. In some implementations, the dynamic wind noise compression tuning pipeline 600 may represent functionality of an integrated circuit, for example, including an image device.

The dynamic wind noise compression tuning pipeline 600 includes a pre-compressor processing unit 610 connected to or in communication with (collectively "connected to") a compressor(s) 620, which in turn is connected to a post-compressor processing unit 630. The dynamic wind noise compression tuning pipeline 600 further includes a detector 640 connected to a compressor threshold setting unit 650 and a compressor parameters setting unit 660. The compressor threshold setting unit 650 and the compressor parameters setting unit 660 are connected to the compressor(s) 620.

An operational discussion of FIG. 6 is provided with reference to FIGS. 7A-7C. FIGS. 7A-7C are block diagrams of an example of an image capture device 700 changing orientations relative to a direction of wind 730. The image capture device 700 may include any or all features and/or characteristics described with respect to FIGS. 1-6. The image capture device 700 includes a body 705, one or more optical components 710 structured on the body 705, a first microphone 715, and a second microphone 720 internal to and structured on the body 705. Although shown as a single element, in alternate embodiments, the number of each element may be varied without departing from the scope of the present disclosure.

When the image capture device 700 is facing the wind 730 as shown in FIG. 7A, the first microphone 715 is facing directly into the wind 730. In an implementation, the first microphone 715 may be a front facing or optical component 710 facing microphone. In such an implementation and scenario, the first microphone 715 provides superior or significant wind noise performance as compared to other orientations of the image capture device 700 due to the creation of a stagnant pressure region. That is, placement of a microphone along the direction of the optical axis and same view of the optical component or lens is beneficial to operation of the image capture device 700 in wind noise scenarios. However, changes in the orientation of the image capture device 700, as shown in FIGS. 7B and 7C, result in the wind 730 impacting each microphone, the first microphone 715 and the second microphone 720, differently due to the body 705 and other factors. As a result, the microphone signal levels may vary and impact listenability of the audio.

Operationally, the dynamic wind noise compression tuning pipeline 600 and the techniques described herein normalize the audio signal levels received from each of the microphones by adjusting the compressor based on the coherence measurements. In an implementation, the pre-compressor processing unit 610 receives inputs from, for example the first microphone 715 and the second microphone 715, and processes the inputs, including but not limited, applying gain to the inputs to enable making the input listenable. The detector 640 receives inputs from the first microphone 715 and the second microphone 715, for example, and generates coherence measurements. In an implementation, the detector 640 may receive inputs at every x Hz frequency bands from each microphone, where x is selected to balance frequency resolution with processing costs.

The compressor threshold setting unit 650 uses the coherence measurement to set the compressor threshold(s) and the compressor parameters setting unit 660 uses the coherence measurement to set the compressor parameters, both of which are used by the compressor(s) 620 as appropriate. In an implementation, the compressor threshold setting unit 650 may use a look-up table (LUT) indexed by the coherence measurement. In an implementation, the compressor parameters setting unit 660 may use a look-up table (LUT) indexed by the coherence measurement. In an implementation, the LUTs may be stored in memory or storage such as storage 440. In an implementation, where the compressor is a multiband device, each frequency band may use the same LUT to adjust the 2 frequency bands similarly per the coherency measurement. In an implementation, where the compressor is a multiband device, each frequency band may use different LUTs to adjust the 2 frequency bands independently per the coherency measurement.

The compressor(s) 620 compares an audio signal output from the pre-compressor processing unit 610 with the adjusted compressor threshold. If the audio signal output is above the compression threshold, then the compressor(s) 620 applies the adjusted compression parameters to the audio signal output. If the audio signal output is below the compression threshold, then the compressor 620 applies the default compression parameters to the audio signal output. The post-compressor processing unit 630 processes the output of the compressor(s) 620 to generate the output.

In an implementation, the pre-compressor processing unit 610, the compressor(s) 620, and the post-compressor processing unit 630 may be combined into one unit or be implemented by a processor such as processor 525. In an implementation, the pre-compressor processing unit 610, the compressor 620($s$), the post-compressor processing unit 630, and the detector 640 may be combined into one unit. In an implementation, the pre-compressor processing unit 610, the compressor 620, the post-compressor processing unit 630, and the detector 640 implemented by a processor such as processor 525.

FIG. 8 is a flowchart showing an example of a technique 800 for dynamic wind noise compression tuning. The technique 800 includes detecting 810 the presence of wind noise by measuring coherence between microphones; adjusting 820 a compression threshold based on the coherence measurements; adjusting 830 compression parameters based on the coherence measurements; applying 840 the adjusted compression parameters when audio signal is above the adjusted compression threshold; and applying 850 default compression parameters when audio signal is below the adjusted compression threshold.

The technique 800 includes detecting 810 the presence of wind noise by measuring coherence between microphones. Coherence measurements between microphones is an indicator of the amount of wind noise or turbulence is present in the microphone signals. In an implementation, a detector analyzes the inputs of at least two microphones to determine the coherence measurements. In an implementation, the coherence measurement may be a range of values where one end of the range indicates windy conditions and another end of the range indicates no wind noise conditions. In an implementation, the coherence measurement is a value between 0 and 1, where 0 indicates windy conditions and 1 indicates no wind noise conditions.

The technique 800 includes adjusting 820 a compression threshold based on the coherence measurements. The compression threshold indicates when the dynamic range of an audio signal needs to be compressed and other properties of the audio signal need to be adjusted. It is initially set to a default value which attempts to cover a wide range of scenarios. In an implementation, a LUT may be used where the coherence measurement is an index into the LUT. In an implementation, the compression threshold is reduced so that compression starts at an earlier or lower value. In an implementation, the compression threshold is set so that the dynamic range is compressed greater as compared to the default value. In an implementation, the compression threshold is an amplitude or power value.

The technique 800 includes adjusting 830 compression parameters based on the coherence measurements. The compression parameters are used to change the dynamic range of the audio signal and include, for example, a gain parameter. They are initially set to default values to cover a wide range of scenarios. In an implementation, a LUT may be used where the coherence measurement is an index into the LUT. In an implementation, the gain parameter may be increased to maintain audio signals at a nominal level or nominal level range across all the microphones. In an implementation, the gain parameter may be increased to normalize the audio signal across all the microphones.

The technique 800 includes applying 840 the adjusted compression parameters when the audio signal is above the adjusted compression threshold. If the audio signal is stronger, greater, louder, more power, more amplitude, and the like than the adjusted compression threshold, then the compressor(s) apply the adjusted compression parameters. In an implementation, the gain of the compressed audio signal may be increased to maintain the audio signal at a nominal level or nominal level range across all the microphones. In an implementation, the gain of the compressed audio signal may be increased to normalize the audio signal across all the microphones.

The technique 800 includes applying 850 default compression parameters when audio signal is below the adjusted compression threshold. If the audio signal is weaker, lower, quieter, less power, less amplitude, and the like than the adjusted compression threshold, then the compressor(s) apply the default compression parameters. That is, the audio signal is already at or near a nominal value or nominal value range.

FIG. 9 is a flowchart showing an example of a technique 900 for setting audio compressors in different environments. The technique 900 includes providing 910 default compressor settings for microphones; detecting 920 an environmental condition by measuring relational statistics between microphones; adjusting 930 a compression threshold based on the relational statistic measurements; adjusting 940 compression parameters based on the relational statistic measurements; applying 950 the adjusted compression parameters when audio signal is above the adjusted compression threshold; and applying 960 default compression parameters when audio signal is below the adjusted compression threshold.

The technique 900 includes providing 910 default compressor settings for microphones. A compressor(s) is preset with default compressor settings including a default compression threshold and default compressor parameters which attempt to provide audio signals at a nominal level across a variety of environmental and use conditions.

The technique 900 includes detecting 920 an environmental condition by measuring relational statistics between microphones. Relational statistic measurements between microphones are an indicator if whether an environmental condition is impacting or affecting the microphones in different ways. In an implementation, a detector analyzes the inputs of at least two microphones to determine the relational statistic measurements. In an implementation, the relational statistic measurement may be a range of values where one end of the range indicates environmental impact conditions and another end of the range indicates no environmental impact conditions. In an implementation, the relational statistic measurement is a value between 0 and 1, where 0 indicates environmental impact conditions and 1 indicates no environmental impact conditions. In an implementation, the environmental condition is wind noise. In an implementation, the relational statistic measurement is a coherence measurement.

The technique 900 includes adjusting 930 a compression threshold based on the relational statistic measurements. The compression threshold indicates when the dynamic range of an audio signal needs to be compressed and other properties of the audio signal need to be adjusted. In an implementation, a LUT may be used where the relational statistic measurement is an index into the LUT. In an implementation, the compression threshold is reduced so that compression starts at an earlier or lower value. In an implementation, the compression threshold is set so that the dynamic range is compressed greater as compared to the default value. In an implementation, the compression threshold is an amplitude or power value.

The technique 900 includes adjusting 940 compression parameters based on the relational statistic measurements. The compression parameters are used to change the dynamic range of the audio signal and include, for example, a gain parameter. They are initially set to default values to cover a wide range of scenarios. In an implementation, a LUT may be used where the relational statistic measurement is an index into the LUT. In an implementation, the gain parameter may be increased to maintain audio signals at a nominal level or nominal level range across all the microphones. In an implementation, the gain parameter may be increased to normalize the audio signal across all the microphones.

The technique 900 includes applying 950 the adjusted compression parameters when the audio signal is above the adjusted compression threshold. If the audio signal is stronger, greater, louder, more power, more amplitude, and the like than the adjusted compression threshold, then the compressor(s) apply the adjusted compression parameters. In an implementation, the gain of the compressed audio signal may be increased to maintain the audio signal at a nominal level or nominal level range across all the microphones. In an implementation, the gain of the compressed audio signal may be increased to normalize the audio signal across all the microphones.

The technique 900 includes applying 960 default compression parameters when audio signal is below the adjusted compression threshold. If the audio signal is weaker, lower, quieter, less power, less amplitude, and the like than the adjusted compression threshold, then the compressor(s) apply the default compression parameters. That is, the audio signal is already at or near a nominal value or nominal value range.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device with dynamic wind noise compression tuning, the image capture device comprising:
a configuration unit configured to adjust a compression threshold based on a measure of coherence, the measure of coherence indicative of wind noise; and
a compressor configured to:
apply adjusted compression parameters to audio signals from at least two microphones of the image capture device when an audio signal for a microphone from the at least two microphones breaches the adjusted compression threshold in one direction; and
apply default compression parameters to the audio signals from the at least two microphones when the audio signal for the microphone from the at least two microphones breaches the adjusted compression threshold in another direction.

2. The device of claim 1, wherein the configuration unit is further configured to increase, for the compressor, gain parameters based on the measure of coherence.

3. The device of claim 2, wherein increasing the gain parameters results in amplification of at least a portion of the audio signal for the microphone.

4. The device of claim 3, wherein the configuration unit reduces the compression threshold to initiate compression at an earlier value relative to a default compression threshold.

5. The device of claim 1, wherein the default compression parameters produce the audio signal for the microphone near or at a nominal level and the adjusted compression threshold and adjusted compression parameters maintain the audio signal for the microphone near or at the nominal level in windy conditions.

6. The device of claim 5, wherein the configuration unit reduces the compression threshold to increase dynamic range compression as compared to dynamic range compression achieved using a default compression threshold.

7. The device of claim 1, wherein the measure of coherence is a value in a range of values where one end of the range indicates windy conditions and another end of the range indicates no wind noise conditions.

8. The device of claim 1, further comprising:
the configuration unit configured to use a compression threshold look-up table (LUT) indexed by the measure of coherence to adjust the compression threshold; and
the configuration unit configured to use a compression parameters LUT indexed by the measure of coherence to adjust compression parameters.

9. The device of claim 1, further comprising:
an optical component, wherein one of the at least two microphones is positioned to face a view direction of the optical component.

10. A method for dynamic wind noise compression tuning, the method comprising:
obtaining a reduced compression threshold relative to a default compression threshold based on a coherence measure for a pair of microphones of an image capture device;
using an increased gain parameter in lieu of a default gain parameter when an audio signal for a microphone from the pair of microphones breaches the reduced compression threshold in one direction, the increased gain parameter based on the coherence measure; and
using the default gain parameter when the audio signal for the microphone from the pair of microphones breaches the reduced compression threshold in another direction.

11. The method of claim 10, wherein the reduced compression threshold initiates compression at an earlier value relative to the default compression threshold.

12. The method of claim 11, wherein the increased gain parameter results in amplification of at least a portion of the audio signal.

13. The method of claim 10, wherein the default compression threshold and the default gain parameter produce the audio signal near or at a nominal level in non-wind noise conditions and the reduced compression threshold and the increased gain parameter maintain the audio signal near or at the nominal level in windy conditions.

14. The method of claim 13, wherein use of the reduced compression threshold increases dynamic range compression as compared to dynamic range compression achieved using the default compression threshold.

15. The method of claim 10, wherein the coherence measurement is a value in a range of values where one end of the range indicates windy conditions and another end of the range indicates no wind noise conditions.

16. The method of claim 15, further comprising:
indexing into a compression threshold look-up table (LUT) by the coherence measure to adjust the compression threshold.

17. A method for dynamic compression tuning, the method comprising:
when an audio signal for a microphone from a pair of microphones of an image capture device breaches a reduced compression threshold in one direction, initiating early dynamic range compression which is earlier relative to a default dynamic range compression, wherein the reduced compression threshold is reduced relative to a default compression threshold and based on a coherence measure for the pair of microphones; and
when the audio signal for the microphone from the pair of microphones breaches the reduced compression threshold in another direction, initiating the default dynamic range compression.

18. The method of claim 17, the method comprising:
obtaining an increased gain parameter relative to a default gain parameter based on the coherence measure; and
when an audio signal for a microphone from the pair of microphones breaches the reduced compression threshold, using the increased gain parameter.

19. The method of claim 18, wherein the increased gain parameter results in amplification of at least a portion of the audio signal.

20. The method of claim 19, wherein the dynamic range compression is associated with producing the audio signal near or at a nominal level in non-wind noise conditions and the increased gain parameter maintains the audio signal near or at the nominal level in windy conditions.

* * * * *